United States Patent [19]
Warner et al.

[11] Patent Number: 5,456,286
[45] Date of Patent: Oct. 10, 1995

[54] SHAFT SEAL COOLANT FLOW CONTROL

[75] Inventors: Dale J. Warner; Dale J. Warner, both of Palm Harbor, Fla.

[73] Assignee: A. W. Chesterton Co., Stoneham, Mass.

[21] Appl. No.: 278,578

[22] Filed: Jul. 21, 1994

Related U.S. Application Data

[63] Continuation of Ser. No. 107,064, Aug. 17, 1993, abandoned.

[51] Int. Cl.[6] ..................................................... F16K 11/00
[52] U.S. Cl. ........................... 137/594; 251/121; 251/205
[58] Field of Search .............................. 137/594; 251/205, 251/121; 138/46

[56]  References Cited

U.S. PATENT DOCUMENTS

| | | | |
|---|---|---|---|
| 1,777,261 | 9/1930 | Grainger et al. | 251/121 |
| 4,624,444 | 11/1986 | Johnson | 251/205 X |
| 4,795,131 | 1/1989 | Scarano et al. | 137/625.3 X |
| 4,971,099 | 11/1990 | Cyvas | 137/625.3 X |

FOREIGN PATENT DOCUMENTS 587575  4/1947  United Kingdom .................... 251/205

*Primary Examiner*—John C. Fox
*Attorney, Agent, or Firm*—Hill, Steadman & Simpson

[57]  ABSTRACT

For a shaft seal for a pump, a barrier fluid flow and pressure control method, system, and apparatus providing a manifold having oppositely axially arranged flow and pressure control valves, the control valves having open-ended valve cylinders reciprocally adjustable within flow channels of the manifold, the valve cylinders having elongate flow orifices selectively positionable within the flow channel with said orifice in selective registry with a respective outlet. The extent of registry of the elongate orifice with the respective outlet controls the rate of flow through the valve. The pressure control valve sets the barrier fluid pressure while the flow control valve sets a minimum flow required for the barrier fluid operation.

21 Claims, 1 Drawing Sheet

SHAFT SEAL COOLANT FLOW CONTROL

This is a continuation, of application Ser. No. 08/107,064, filed Aug. 17, 1993, now abandoned.

BACKGROUND OF THE INVENTION

The present invention relates to a control system for barrier fluid circulation used in double seal-type shaft seals typically used in pumps and other rotating equipment. Typically, barrier fluids use an external supply of cooling fluid such as water which aids in sealing and can serve to cool the seals.

Double seals are used in severe sealing conditions. A barrier fluid is introduced between the seals to serve several purposes, including: to lubricate and cool the outboard seal that normally does not see the working fluid; or to flush or dilute any working fluid (actual fluid being pumped by the pump) that should leak past the inboard seal; or to lubricate the inboard seal when the working fluid has poor lubricating qualities; or to cool the inboard seal. Double seal installations typically utilize barrier fluids in one of two ways: a closed system using pressure tanks and heat radiators and a recirculating system for continuously reusing the barrier fluid; or an open flush system where a continuous supply of barrier fluid passes through the seal arrangement only once before disposal or collection.

For an open flush system, modern environmental laws and conservation efforts demand improved monitoring and control to minimize the barrier fluids used in these systems. It is advantageous for a system to allow the user to establish the minimal flow rate that is necessary to cool the seal while maintaining the necessary barrier fluid pressure.

SUMMARY OF THE INVENTION

It is an object of the present invention to provide a method, a control system and apparatus for maintaining proper barrier fluid pressure within a seal arrangement while minimizing the amount of barrier fluid flow through the seal arrangement. It is an object of the present invention to provide, for a double seal arrangement, a minimal amount of barrier fluid flow between the inboard and outboard seals to lubricate and cool the outboard seal, to flush or dilute any working fluid that should leak past the inboard seal, to lubricate the inboard seal when the working fluid has poor lubricating qualities, and to cool the inboard seal. It is an object of the present invention to provide an apparatus which allows fine tuning adjustment of the barrier fluid flow rate and to provide control valves which resist clogging.

The objects of the invention are inventively achieved in that a control valve manifold is provided which has a first and second controlled passage therethrough for adjusting the barrier fluid flow rate and the barrier fluid pressure between an inboard and outboard seal. Additionally, a novel control valve arrangement is provided which resists clogging. Unlike the typical "V" flow control valve, where the flow is adjusted based on clearance between a movable valve plug element and the valve body wall, particularly the inner space between a V-shaped notch cut in the valve plug element and the wall of the valve body, the control valve constructed in accordance with the principles of the present invention controls flow rate or pressure based on the extent of registry of an elongate orifice formed through an otherwise closed-ended cylindrical valve element with an outlet of the valve body.

The orifice of the closed-ended valve element is preferably increasing in width in an axial direction of movement of the valve element to permit a wide range of flow rates corresponding to movement of the valve element. The orifice has angled side walls opening outwardly to prevent clogging. By configuring the exit orifice in this manner, solids contained in the fluid tend to settle on the floor of the valve, especially since the flow direction through the valve makes a right angle when it flows through the orifice.

In order to reduce the amount of barrier fluid used by the system, each gallon of fluid flowing through the seal must remove a calculated amount of heat from the system notwithstanding the desire to reduce the flow rate of barrier fluid. In order to prevent damage to the seal, the maximum temperature at which heat can be safely transferred for fluid, such as water, is 160 to 180° F. prior to leaving the seal. Above this temperature range, water may be converted to steam during pressure fluctuations of the system. The formation of steam within the seal arrangement is detrimental, dramatically shortening the life of the seal. By using a lower temperature range of water exiting the seal, the amount of water required to remove heat from the system is increased. For example, if the ambient water temperature is 70° F., and the water flow is initially adjusted to discharge at a temperature of 100° F., water usage can be reduced by 71% by increasing the discharge temperature to 175° F.

The control valves constructed in accordance with the principles of the present invention allow for fine adjustments at the higher barrier fluid temperatures and lower flow rates required to remove heat from the system. Furthermore, the control valves are designed to resist clogging by providing a 90° fluid turn to the exit orifices of the control valves. The system ensures that the necessary barrier fluid pressure is maintained while the flow rates for quenching the double seal installation are reduced to a minimum.

DETAILED DESCRIPTION OF THE PREFERRED EMBODIMENTS

Figure 1:
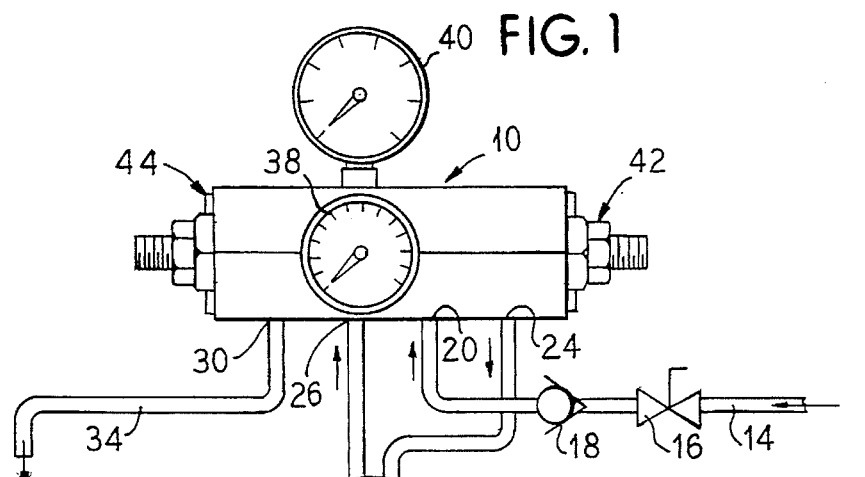
FIG. 1 is an elevational view of the control manifold of the present invention with the remaining portions of the system shown schematically.

FIG. 1 illustrates the control manifold 10 of the present invention. The manifold has a hexagonal outside shape. The manifold 10 receives barrier fluids such as water from a supply line 14 and delivers barrier fluid to a seal 16 such as a double seal having an inboard seal and an outboard seal (not shown). The barrier fluid typically is delivered between the inboard and outboard seal. The supply line 14 delivers barrier fluid through a shut-off valve 16, through a check valve 18 to an inlet 20 of the manifold 10. The manifold 10 delivers barrier fluid from an outlet 24 to the seal assembly 16 and the barrier fluid is returned to a return inlet 26 to the manifold 10 and thereafter drained at a drain outlet 30 to a drain line 34 to be disposed or recycled. A temperature gauge 38 monitors the temperature of the water returned at the inlet 26 and a pressure gauge 40 monitors the pressure at that point. A flow control valve 42 is provided on one side of the manifold 10 and a pressure control valve 44 is provided at a respective opposite side.

The pressure control valve 44 is identically configured as the flow control valve 42 except facing axially in an opposite direction. To simplify the description, only the flow control valve 42 will be described in detail.

The flow control valve 42 comprises a bushing 50 having male threads 52 engaged to female threads 54 of a body 56 of the manifold 10. An O-ring 58 is provided between the bushing 50 and a bore 60 of the body 56 to seal the bushing 50 to the body 56. The bushing provides an internal channel 62 open to a stepped threaded bore 64. Axially arranged within the bore 64 and the channel 62 is a valve element 70. The valve element 70 comprises from left to right, a valve body 72, a pin 74, a wave spring 76, a valve adjuster 78 with surrounding male threads 80, and a secondary O-ring 82. A lock nut 84 is threadingly engaged around the male threads 80 of the valve adjuster 78 and locks the adjuster to the bushing.

The valve body 72 tightly interfits within an axial bore 90 which is open to the stepped threaded bore 64. The valve body 72 extends from the axial bore an adjustable distance into an annular channel 92 formed by the stepped threaded bore 64 which flow communicates with the outlet 24. The valve body has an open end 94 flow communicating with the inlet 20 and an elongate tapered orifice 96 shown more clearly with respect to the pressure control valve 44. The elongate orifice 96 is tapered to have its widest clearance 98 at a trailing end of the valve body 72 with respect to the direction of flow. The orifice 96 has a tapered profile which allows fine tuning adjustment of the valve over its axial range of motion especially for low flow rates.

At an opposite end of the valve body 72 is a closed head portion 100 which moves reciprocally within the bushing channel 62. At an end of the closed head portion 100 is an aperture 101 for receiving the pin 74. Between the head portion 100 and the adjuster 78 is a spring 76. The pin 74 is fixed in the adjuster 78 within a pin bore 104 and is slidable into the aperture 101. The adjuster 78 is threaded into the bushing 50 and by progressing the adjuster 78 into or out of the bushing 50, the adjuster becomes an axial direction limit stop for the valve body 72 toward the right of FIG. 3. Water pressure and velocity within the valve body 72 will maintain the valve body 72 toward the right and against the adjuster 78.

Flow through the inlet 20 proceeds through the open end 94 of the valve body 72 and through the orifice 96 into the annular channel 92 and out of the outlet 24. To adjust the flow rate, the adjuster 78 is threaded into or out of the bushing 50 which adjusts the amount of the orifice 96 which is in flow communication with the annular channel 92. After adjustment is made, the lock nut 84 can be tightened against the bushing to fix the position of the adjuster 78. The adjuster 78 is rotated to progress through the bushing 50 by a hexagonal socket 110 shown with regard to the valve 44. An allen wrench or the like is inserted into the indent 110 to adjust the valve.

Figure 2:
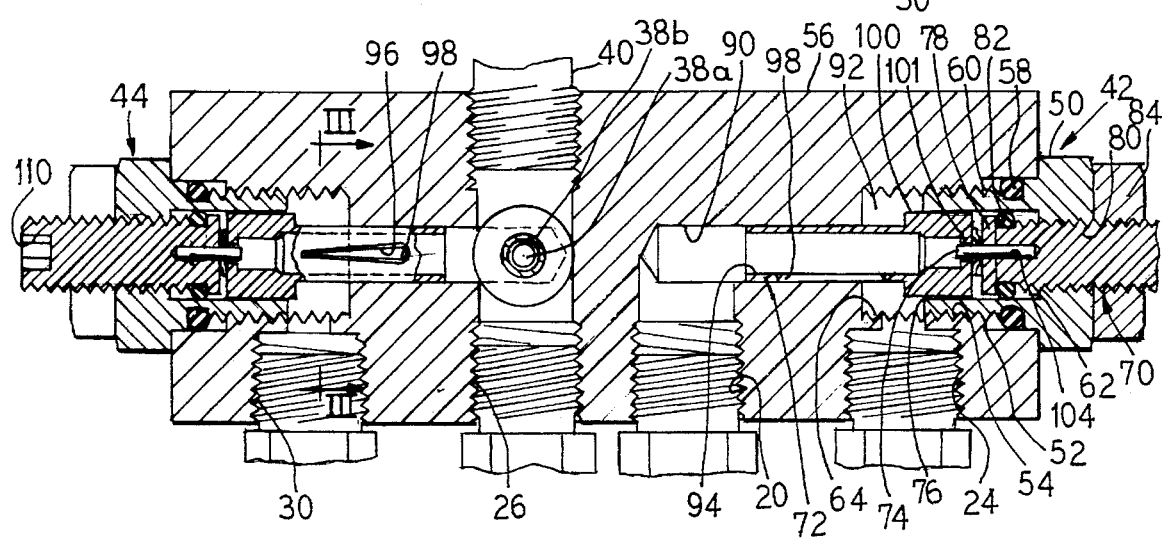
FIG. 2 is a longitudinal sectional view of the manifold shown in FIG. 1.

FIG. 2 shows the temperature gauge 38 protruding into the inlet region 26 with a thermocouple 38a located within a thermowell 38b.

Figure 3:
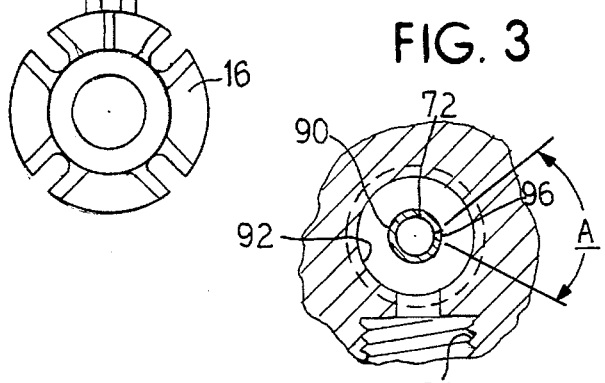
FIG. 3 is a sectional view taken generally along line III—III of FIG. 2.

FIG. 3 illustrates the aperture 96 which has angular aperture walls which resist clogging thereof. An angle A equal to 60° is advantageous.

The construction of the connection between the valve body 72 and the adjuster 78 allows for some degree of axial flexibility provided by the wave spring 76 and the pin 74 acting as a guide.

A method for coordinating the setting of the valves 42, 44 is as follows. First, the valves 42, 44 are fully opened. Next, the supply valve 16 is slowly opened to purge air from the system. The pressure control valve 44 is then slowly closed until the desired barrier fluid pressure is reached. Then, the flow control valve 42 is slowly closed until the pressure begins to drop in the manifold. The barrier fluid pressure within the manifold is then reset using the pressure control valve 44. Next, time is allotted for the discharge temperature of the barrier fluid to stabilize, the time period being typically 10–15 minutes. The flow control valve 42 is then closed, typically one turn clockwise. The pressure control valve 44 is readjusted to maintain the desired pressure. The temperature of the barrier fluid at the discharge is then allowed to stabilize once again. If the temperature as stabilized is still too low, that is, less than the optimal temperature for a minimized barrier fluid flow rate, the flow control valve 42 is turned another turn clockwise and the pressure control valve 44 is readjusted to maintain the desired pressure. The discharge temperature is again allowed to stabilize and if the temperature is still low the flow control valve 42 is closed one turn clockwise and the pressure control valve 44 is readjusted to maintain the desired pressure. This procedure is repeated until the discharge temperature approaches the desired discharge temperature, wherein the procedure is repeated with the adjustment to the flow control valve 42 incremented at quarter turns rather than full turns clockwise.

Although the present invention has been described with reference to a specific embodiment, those of skill in the art will recognize that changes may be made thereto without departing from the scope and spirit of the invention as set forth in the appended claims.

We claim as our invention:

1. A manifold for controlling pressure and flow of barrier fluid within a seal arrangement, comprising:

a manifold body having an inlet for receiving barrier fluid from a barrier fluid source, a flow outlet for delivering the barrier fluid to the seal arrangement, a return inlet receiving barrier fluid from said seal arrangement, and a drain outlet for disposing barrier fluid from said manifold;

a first bore within said manifold connecting said inlet to said flow outlet;

a second bore within said manifold connecting said return inlet to said drain outlet;

a first valve member mounted within said first bore and selectively regulating flow between said inlet and said flow outlet, said first valve member having a barrier for blocking flow between said inlet and said flow outlet, said barrier providing an orifice flow connecting said inlet with said flow outlet, said orifice selectively uncoverable to allow flow therethrough by axially positioning said first valve member within said first bore to vary the flow rate between the inlet and the flow outlet; and a second valve member mounted within said second bore for adjusting the flow between said return inlet and said outlet drain to control the pressure within the seal arrangement.

2. The manifold according to claim 1, wherein said second valve member is configured substantially identical to said first valve member.

3. The manifold according to claim 1, wherein said first bore comprises an annular flow channel in adjustable flow communication with said flow outlet and said inlet through said orifice.

4. The manifold according to claim 1, wherein said first valve member comprises an adjusting member threadingly engaged within a bore of said manifold for a selective axial positioning of said first valve member into said manifold by an extent of thread engagement.

5. The manifold according to claim 1, wherein said barrier comprises a cylindrical valve body having an open end in flow communication with said inlet; and said orifice is formed through a side wall of said cylindrical valve body, said cylindrical valve body having a closed end opposite said open end, said cylindrical valve body closely fitting within said first bore; and a valve adjusting member separate from said valve body, said valve adjusting member having adjusting male threads arranged around a circumference thereof for threading adjustment into said manifold, said valve adjusting member axially aligned with said valve body, said valve adjusting member providing an end stop facing said valve body for stopping movement of said valve body under pressure influence from barrier fluid flow.

6. The manifold according to claim 5, wherein said valve adjusting member comprises a pin fixed thereto and arranged axially extending toward said valve body, said valve body having an aperture in said closed end thereof for receiving said pin, and said valve adjusting member provides a spring member arranged facing and abuttable to said closed end of said valve body.

7. The manifold according to claim 5, wherein said valve adjusting member further comprises a surrounding bushing having a female threaded bore axially therethrough, and a male threaded extending portion, said extending portion threadingly engaged into said manifold and said adjusting male threads threadingly engaged in said female threaded bore.

8. The manifold according to claim 5, wherein said valve adjusting member comprises a tool engaging socket on an axial end thereof for adjusting said valve adjusting member, and a lock nut surrounding an external portion of said valve adjusting member and tightenable against said manifold for fixing the axial position of said valve adjusting member.

9. The manifold according to claim 1, wherein said orifice is elongate and tapered, with an increasing width in a direction of increased uncovering of said orifice.

10. The manifold according to claim 9, wherein said orifice has outwardly opening angled side walls.

11. The manifold according to claim 1, wherein said second valve member comprises a second orifice flow connecting said return inlet and said outlet drain, said second orifice selectively uncoverable to allow flow therethrough by axially positioning said second valve member within said second bore.

12. The manifold according to claim 1, wherein said barrier comprises a cylindrical valve body having an open end in flow communication with said inlet; and said orifice is formed through a side wall of said cylindrical valve body, said cylindrical valve body having a closed end opposite said open end, said cylindrical valve body closely fitted within said first bore.

13. The manifold according to claim 1, wherein said second valve member comprises a second barrier which comprises a cylindrical valve body having an open end in flow communication with said inlet; and comprising a second orifice for flow connecting said return inlet and said outlet drain, said orifice is formed through a side wall of said second cylindrical valve body, said second cylindrical valve body having a closed end opposite said open end, said second cylindrical valve body closely fitted within said second bore.

14. A valve comprising:

a body having a first inlet passage, a first outlet passage, and an elongate first bore connecting the first inlet passage and the first outlet passage;

a first valve member comprising an elongate cylinder having a surrounding side wall with an open end and a closed end, and Closely slidably fitted and guided within said first bore, said open end toward said inlet passage and said closed end toward said outlet passage, said cylinder having an elongated orifice through said surrounding side wall said orifice having a closed perimeter and located at a distance from said open end, said orifice elongated in the axial direction of said cylinder, said orifice at least partially closable by retraction of said cylinder into said first bore, and at least partially openable by protrusion of said cylinder out of said first bore and into said outlet passage;

first external means for axially positioning said cylinder within said first bore;

said cylinder and said first external means being non-fixedly engaged, said first external means providing a limit stop for maximum extension of said cylinder out of said first bore; and a pin fixed to said first external means and protruding toward said cylinder and said cylinder having an aperture for receiving said pin therein.

15. The valve according to claim 14, wherein said first external means comprises a threaded shaft penetrating a threaded bore of said body and selectively positionable to provide said limit stop for the sliding movement of said cylinder into said outlet passage.

16. The valve according to claim 14, wherein said elongated orifice has a tapering width in a direction toward said closed end of said cylinder.

17. The valve according to claim 14, wherein said body comprises a second inlet passage and a second outlet passage and a second elongate bore connecting the second inlet and outlet passages and further comprising a second valve member, said second valve member comprises a second orifice flow connecting said second inlet and outlet passages, said second orifice selectively uncoverable to allow flow therethrough by axially positioning said second valve member within said second elongate bore.

18. The valve according to claim 17, wherein said second valve member comprises a second cylindrical valve body having an open end in flow communication with said second inlet; and said second orifice is formed through a side wall of said second cylindrical valve body, said second cylindrical valve body having a closed end opposite said open end, said second cylindrical valve body closely fitted within said second bore.

19. The valve according to claim 14, wherein said orifice is the only orifice formed through said surrounding side wall.

20. The valve according to claim 14 further comprising a spring arranged between said cylinder and said first external means.

21. A valve comprising:

a body having a first inlet passage, a first outlet passage, and a first bore connecting the first inlet passage and the first outlet passage;

a first valve member comprising a cylinder having a surrounding side wall with an open end and a closed end, and closely slidably fitted within said first bore, said open end toward said inlet passage and said closed end toward said outlet passage, said cylinder having an elongated orifice through said surrounding side wall, elongated in the axial direction of said cylinder, said orifice at least partially closable by retraction of said cylinder into said first bore, and at least partially openable by protrusion of said cylinder out of said first bore and into said outlet passage;

first external means for axially positioning said cylinder within said first bore;

said first external means comprises a threaded shaft penetrating a threaded bore of said body and selectively positionable to provide a limit stop for the sliding movement of said cylinder into said outlet passage; and wherein said body further comprises a second inlet passage, a second outlet passage, and a second bore connecting said second inlet passage with said second outlet passage, said second bore axially aligned with said first bore; and said valve further comprises a second valve member, identically configured as said first valve member, and slidable within said second bore; and second external means for axially positioning said second valve member within said second bore.

* * * * *